(No Model.)
I. D. WEAVER & C. G. SINGER.
NUT LOCK.
No. 303,078. Patented Aug. 5, 1884.
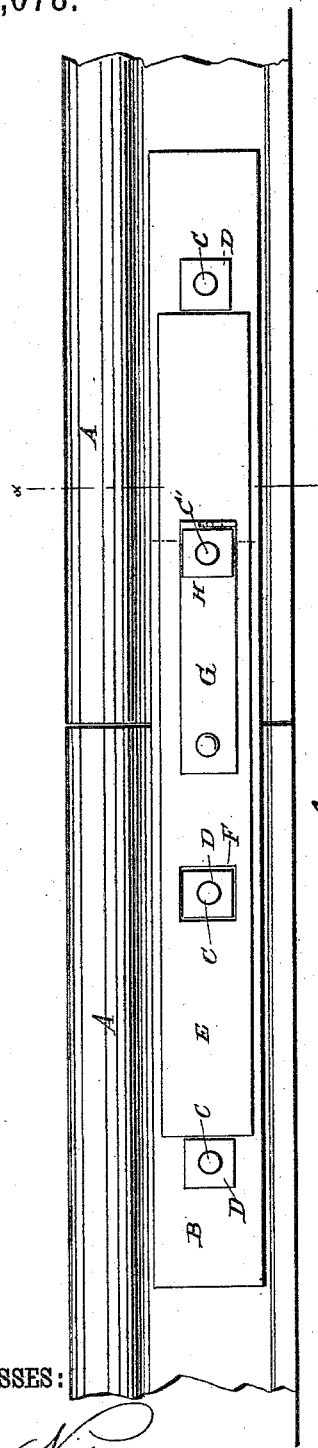
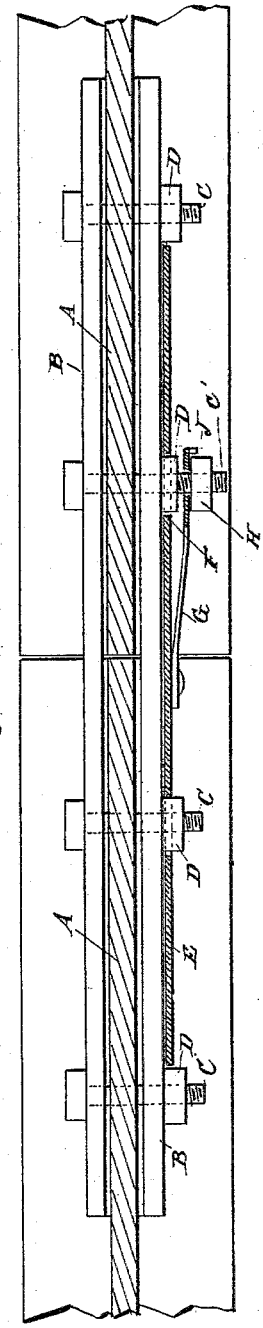
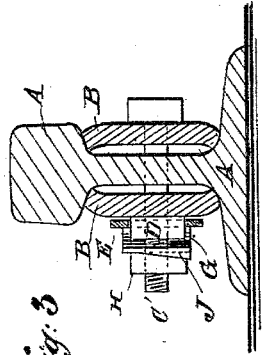
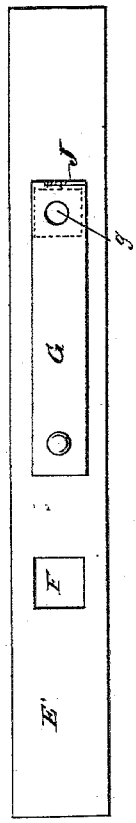
WITNESSES:
INVENTOR:
I. D. Weaver
C. G. Singer
BY Munn & Co
ATTORNEYS.

UNITED STATES PATENT OFFICE.

ISAAC D. WEAVER AND CHRISTIAN G. SINGER, OF LEBANON, PA., ASSIGNORS TO THEMSELVES AND SAMUEL S. MEILY, OF SAME PLACE.

NUT-LOCK.

SPECIFICATION forming part of Letters Patent No. 303,078, dated August 5, 1884.

Application filed February 27, 1884. (No model.)

*To all whom it may concern:*

Be it known that we, ISAAC D. WEAVER and CHRISTIAN G. SINGER, both of Lebanon, in the county of Lebanon and State of Pennsylvania, have invented a new and Improved Nut-Lock, of which the following is a full, clear, and exact description.

This invention relates to that class of nut-locks in which a series of nuts are held by a plate, and thus prevented from turning, and this nut-lock is especially adapted for locking nuts on rails.

The invention consists in a plate provided with apertures for receiving nuts, and with a spring secured on the front of the plate and provided at its free end with an aperture and with a flange, which plate is placed on the fish-plate and over the nuts or over some and against others of the nuts, and one of the bolts is passed through the aperture in the spring-strip, and a nut is then screwed on the said bolt.

Reference is to be had to the accompanying drawings, forming part of this specification, in which similar letters of reference indicate corresponding parts in all the figures.

Figure 1 is a longitudinal elevation of our improved nut-locking device, showing it applied on fish-plates and rails. Fig. 2 is a sectional plan view of the same. Fig. 3 is a cross-sectional elevation of the same on the line $x\,x$ in Fig. 1. Fig. 4 is a face view of the nut-locking plate.

In the drawings, A are the rails; B, the fish-plates uniting them; C, the bolts passed through the rails and fish-plates; D, the nuts on the bolts, and E is the nut-locking plate, which is made of such length that its ends abut against the inner side edges of the end nuts D. The plate E is provided with apertures F for the intermediate nuts D. A spring-strip, G, is riveted at one end to the outer surface of the plate E, and at its free end it is provided with an aperture, $g$, through which one of the intermediate bolts, C', which is longer than the rest, can pass, the free end of the said spring-strip being in front of the outer surface of the nut D of the said bolt C'. A nut, H, is then screwed on the bolt C' in front of the spring-strip G, which is held between the nuts H and D. The free end of the spring-strip G is turned up to form a flange, J, which has its free edge beveled. The nuts D are drawn up tightly. The plate E is placed on the fish-plate, and thus the said plate E prevents the nuts from turning. The nut H is screwed on the outer end of the bolt C' and holds the plate E on the fish-plate by means of the spring-strip G, and the flange J prevents the nut H from turning and becoming loose. If the plate E is to be removed, the spring-strip G is pressed against the nut D, and the nut H can then be unscrewed, thus allowing the spring to be removed from the bolt C'. While screwing up the nut H it acts upon the beveled edge of the flange J, pressing the spring inward until it strikes against the nut D. When the point of the flange J will not allow the nut H to be turned farther, the nut is turned back into such a position that its side is against the flange J.

Having thus described our invention, what we claim as new, and desire to secure by Letters Patent, is—

1. A nut-lock consisting of a plate provided with apertures for receiving the nuts, and with a spring-strip, G, having an aperture and a flange, J, at the outer end, substantially as herein shown and described.

2. The combination, with the rails, fish-plates, bolts, and nuts, of the locking-plate E, the spring G, secured on the plate E, and provided in its free end with an aperture and with a flange at the free end, and of the nut H, screwed on the outer end of the bolt C', substantially as herein shown and described.

ISAAC D. WEAVER.
CHRISTIAN G. SINGER.

Witnesses:
BENJE. F. HARPEL,
H. W. LOUDEN.